United States Patent [19]

Seale et al.

[11] 4,408,043

[45] Oct. 4, 1983

[54] FLUOROCARBON SURFACTANTS

[75] Inventors: Virgil L. Seale, Houston, Tex.; James R. Stanford, Duncan, Okla.; James E. Briscoe, Duncan, Okla.; Glenn S. Penny, Duncan, Okla.

[73] Assignee: Nalco Chemical Company, Oak Brook, Ill.

[21] Appl. No.: 355,398

[22] Filed: Mar. 8, 1982

[51] Int. Cl.³ .................. C07C 95/02; C07C 95/08; C07D 295/08; C07C 43/13

[52] U.S. Cl. .................. 544/87; 544/177; 546/102; 546/104; 546/139; 546/140; 546/180; 546/186; 546/240; 546/266; 546/344; 548/444; 548/518; 548/562; 564/285; 564/286; 564/294; 564/305; 564/442; 564/457; 564/462; 564/505; 568/615

[58] Field of Search .................. 544/87, 177; 546/102, 546/104, 140, 139, 180, 266, 344, 186, 240; 548/444, 518, 562; 564/285, 286, 294, 442, 305, 457, 462, 505; 568/615

[56] References Cited

U.S. PATENT DOCUMENTS

| | | | |
|---|---|---|---|
| 3,678,110 | 7/1972 | Boothe et al. | 568/615 |
| 3,681,413 | 8/1972 | Sweeney et al. | 568/615 |
| 3,681,441 | 8/1972 | Robertson | 568/615 |
| 3,742,013 | 6/1973 | Fielding | 564/285 |
| 3,758,593 | 9/1973 | Koshar | 564/285 |
| 3,882,182 | 5/1975 | Benninger et al. | 568/615 |
| 3,917,724 | 11/1975 | Martini | 568/615 |
| 3,952,060 | 4/1976 | Huber-Emden et al. | 564/285 |
| 3,984,357 | 10/1976 | Koshar | 564/285 |
| 4,000,175 | 12/1976 | Foulletier et al. | 568/615 |
| 4,014,926 | 3/1977 | Dear et al. | 568/615 |
| 4,059,629 | 11/1977 | Foulletier et al. | 568/615 |
| 4,085,137 | 4/1978 | Mitsch et al. | 564/286 |
| 4,165,338 | 8/1979 | Katsushima et al. | 564/285 |
| 4,168,277 | 9/1979 | Mitschke et al. | 568/615 |
| 4,209,456 | 6/1980 | Billenstein et al. | 260/458 R |
| 4,209,635 | 6/1980 | Ukihashi et al. | 568/615 |

FOREIGN PATENT DOCUMENTS 53-53608  5/1978  Japan .

Primary Examiner—Robert W. Ramsuer
Attorney, Agent, or Firm—John G. Premo; Robert A. Miller; Donald G. Epple

[57] ABSTRACT

Fluorinated compounds of the formula

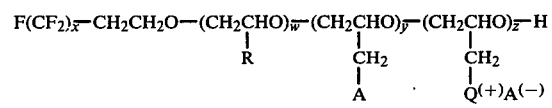

are disclosed. The cationic amine compounds are useful as surfactants.

10 Claims, No Drawings

FLUOROCARBON SURFACTANTS

INTRODUCTION

The perfluoro moiety is useful in the synthesis of surface active compounds and agents. However, the perfluoro moiety is characterized as being both lipophobic, as well as hydrophobic. The perfluoro moiety can be found in substances that are of anionic character such as is described in U.S. Pat. No. 4,208,466 and can also be found in fluorine containing alkylsulfatobetaines as described in U.S. Pat. No. 4,209,456. In addition, the last referenced U.S. patent also describes cationic compounds containing the perfluoro moiety attached to aromatic nitrogen containing functional groups which lead to a quaternary surface active compound containing both cationic charged nitrogen, as well as the perfluoro moiety.

The nitrogen containing cationic perfluorinated compounds are dispersible in water, and therefore, are more readily applicable in a number of end uses. Proposed starting materials for preparing cationic perfluoro ammonium salts are the perfluoro substituted ethyl iodides represented by Formula I.

Formula I

where $x = 2-12$

In the above Formula I, x is an integer ranging from 2–12 or an integer (or fractional integer) representing an average value of from 6–8. However, when these perfluoroalkyl iodides are reacted with strong basic amines such as trimethyl amines, no quaternary perfluoro salts are obtained. The lack of formation of the desired quaternary perfluoro salts is caused by a dehydrohalogenation reaction which occurs when these iodo-fluorocarbons are exposed to strongly basic reaction conditions. The result of this dehydrohalogenation reaction yields almost exclusively perfluoro olefin.

It would, therefore, be an advance in the art if one were able to obtain perfluoro cationic amine compounds using strong basic amine reactants without the disadvantages of strongly competing side reactions.

The present invention allows a variety of unique perfluoro cationic amine compounds to be prepared in good yield without olefin formation occurring and with excellent conversion of the expensive perfluoro precursor. The present invention further allows the balance of hydrophobicity and hydrophilicity by varying the ingredients and reactants used to prepare the finished compounds of the invention.

The present invention allows the synthesis of a variety of unique perfluoro cationic amine compounds which have uses similar to those of commercial fluorocarbon surfactants. These compounds show utility in one or more of the following areas in which fluorocarbons are known to be effective:

(1) hydrocarbon emulsifiers in water;
(2) ore flotation aids;
(3) the treatment of porous substrates to modify surface characteristics (substrates such as leather, wood porous plastics, and various natural or synthetic textiles may be treated);
(4) oil and water repellants;
(5) general surfactants;
(6) additives for dry powder fire extinguisher compositions;
(7) antimicrobials;
(8) soil repellants;
(9) additives for polishes and waxes;
(10) corrosion inhibitors for oils and lubricants;
(11) foaming and wetting agents;
(12) emulsifier and leveling agents for dye preparations.

THE INVENTION

The instant invention describes a perfluoro halogenated material which is easily reacted with strongly basic N-alkyl substituted amines or with aromatic and-/or heterocyclic amines to yield very stable nitrogen containing cationic perfluoro compounds having exceptional surface active character. A variation in the ratios of the reactants used to synthesize the compounds of this invention allows the control of the balance of hydrophobicity and hydrophilicity of the resulting compositions.

The invention covers chemical compositions, compounds, and admixtures of compounds described by the following formula:

Formula II

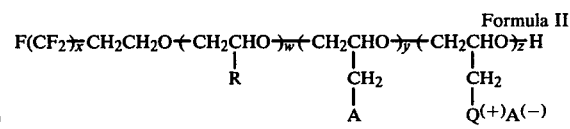

wherein x is an integer of from 2–12 or an integer or fractional integer representing an average value of from 2–12; w is an integer of from 1–20 or an integer or fractional integer representing an average value of from 1–20; y and z are both individually integers from 0–20 or are integers or fractional integers representing average values of from 0–20, provided that the sum, y+z, is from 1–20; R represents a hydrogen, methyl, ethyl, or propyl radical, or mixtures thereof; Q is a cationic nitrogen containing radical from the group consisting of:

(i) an aromatic/heterocyclic amino radical formed from the following compounds: 2-H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4aH-carbazole, carbazole, β-carboline, phenanthridine, acridine, phenanthroline, phenazine, imidazolidine, phenoxazine, cinnoline, pyrrolidine, pyrroline, imidazoline, piperidine, piperazine, indoline, isoindoline, quinuclidine, morpholine, azocine, azepine, 2H-azepine, 1,3,5-triazine, thiazole, pteridine, dihydroquinoline, hexa methylene imine, indazole; and (ii) an amine radical represented by the formula:

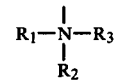

wherein $R_1$, $R_2$, and $R_3$ are from the group consisting of hydrocarbon radicals containing from 1–30 carbon atoms and hydrogen radicals, provided that at least one of $R_1$, $R_2$, and $R_3$ is from the group of alkyl, aryl, alkaryl, aliphatic, or cycloaliphatic hydrocarbon radicals containing from 1–30 carbon atoms and that when any one of the $R_1$, $R_2$, and $R_3$ radicals contains more than 4 carbon atoms, the other two radicals are each chosen from the group consisting of hydrogen, methyl, and ethyl radicals; and A is a halogen chosen from the group consisting of chlorine, bromine, and iodine. This halogen may be present as either an halo radical covalently bonded to carbon or as an anion.

In the above Formula II, x is preferably an integer of from 4–10; w is an integer of from 4–10 or an integer or fractional integer representing an average value of from 4–10; y and z are each integers of from 0–8 or are integers or fractional integers representing an average value of from 0–8, provided that the sum, y+z, is from 1–8; R is preferably chosen from the group consisting of hydrogen and methyl radicals or mixtures thereof, A is preferably chlorine, and Q is preferably chosen from the group of cationic nitrogen containing radicals formed by reacting dimethyl amine, trimethyl amine, pyridine, quinoline, isoquinoline, N,N-dimethyl aniline, N-methyl morpholine, or morpholine with a chloro radical functional group.

In the above Formula II, x is most preferably an integer of from 6–8 or an integer or fractional integer representing an average value of from 6–8. The term average value indicates that the formula may represent an admixture of compounds which contain molecules in which X may be any even numbered integer from 2–14. In the meaning of average value, x may be an integer, such as 8, or a fractional integer such as 7.2, 7.5, 7.8, 8.2, 8.5, 8.8, and the like.

Also, in Formula II, w is most preferably an integer of from 6–8 or an integer or fractional integer representing an average value of from 6–8. Likewise, y and z are each most preferably integers from 0–4 or are integers or fractional integers representing average values from 0–4, provided that the sum, y+z, is from 1–4. The most preferred formula is one wherein the ratio y/z has a value from 0 to 1.0.

The most preferable R is from the group of hydrogen radicals and methyl radicals and/or mixtures thereof, particularly equimolar mixtures of these radicals; the most preferred Q is from the group of cationic nitrogen containing radicals formed by reaction of trimethyl amine, pyridine, quinoline, morpholine, and isoquinoline with a pendant chloro radical.

The most preferred nitrogen-containing cationic perfluoronated compounds of this invention are those represented by the following formula:

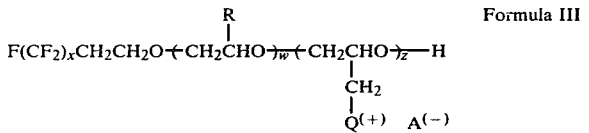

Formula III wherein x, w, z, R, Q, and A have the meanings outlined above. This formula represents the fully reacted cationic compounds of the invention. In this formula, no detectable residual mer unit from the epihalohydrin reactant remains in the molecule or admixture of molecules derived from the reaction sequence to be taught later. Analytical monitoring of the formed halide inorganic anion demonstrates that substantially all of the halo radical functional group derived from the epihalohydrin mer unit has been reacted with the amine reactants. Q in Formula III is most preferably cationic nitrogen containing radicals chosen from the group consisting of trimethyl amino, pyridino, quinolino, isoquinolino, morpholino, and N-methyl morpholino radicals.

The compositions of this invention are prepared by a reaction of a perfluoro alcohol with ethylene oxide, propylene oxide, butylene oxide, or mixtures thereof under anhydrous conditions. These oxide compounds will be referred to as oxiranes and substituted oxiranes. This reaction between the oxiranes and substituted oxiranes mentioned above and the perfluoro alcohols is catalyzed by Lewis acid catalysts. Examples of these Lewis acid catalysts are antimony pentachloride, aluminum chloride, zinc chloride, ferrous or ferric chloride, boron trifluoride, stannic chloride, boron trichloride, and the like. Following the reaction of the perfluoro alcohol with the oxirane or substituted oxirane molecules mentioned above to form the first alkoxylated ADDUCT, an additional Lewis acid catalyzed reaction between this first alkoxylated ADDUCT and an epihalohydrin compound is completed. This second FINAL ADDUCT is then represented by Formula IV.

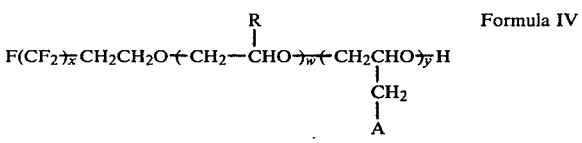

Formula IV

In Formula IV, x, w, y, and R have the same meaning as they hold in Formula II and Formula III above. In Formula IV, A represents a halogen radical chosen from the group consisting of the chloro, bromo, and iodo halogen radical. The FINAL ADDUCT of Formula IV is then reacted with an alkylated amine, whose description follows, to obtain partially quaternized, fully quaternized cationic compounds, or partially or fully cationized amine hydrohalide compounds, which are the subject of the instant invention.

The compositions of this invention, therefore, are reaction products which are obtained from the Lewis acid catalyzed reaction of 1H, 1H, 2H, 2H perfluoroalkanols with ethylene oxide, propylene oxide, butylene oxide, or mixtures thereof followed by the Lewis acid catalyzed reaction of this ADDUCT with an epihalohydrin such as epichlorohydrin, epibromohydrin, and epiiodohydrin to form a FINAL ADDUCT. This FINAL ADDUCT of the perfluoro alcohol/oxirane/ and epihalohydrin is then quaternized or partially quaternized or reacted partially or completely with an appropriate alkylated amine or aromatic/heterocyclic amine to yield the products of this invention.

The Starting Perfluoro Alcohol Compounds

The starting perfluoro compounds which are used to generate perfluoronated substituents within the compositions of this invention are derived from perfluoro substituted ethanols which are represented by Formula V.

FORMULA V

In the above Formula V, x has the numerical values previously indicated in Formula II. A preferred perfluoro ethanol is commercially obtained from E. I. duPont de Nemours & Co. under the commercial name "Zonyl BA." This material is generally described by Formula V wherein x is equal to 6, 8, 10, and 12, and wherein the average x is equal to about 8. An average x, again, indicates that the compounds used may be an admixture of molecules wherein x is individually 6, 8, 10, 12, and the like with the numerical average being about 8.

The Oxiranes and Substituted Oxiranes

The starting oxirane and substituted oxirane used to initially react with the perfluoronated alcohols previously described are chosen from the group consisting of ethylene oxide, propylene oxide, butylene oxide and mixtures thereof. The preferred oxirane reactants are chosen from the group consisting of ethylene oxide, propylene oxide and mixtures thereof. The most preferred oxirane reactant is an equal molar ratio mixture of ethylene oxide and propylene oxide.

The Epihalohydrins

The starting epihalohydrins used to react with the perfluoronated alcohol ADDUCTS with the oxirane compounds previously described are chosen from the group consisting of epichlorohydrin, epibromohydrin, and epiiodohydrin. The preferred epihalohydrin is epichlorohydrin.

The Starting Amines

The starting amines used in the preparation of the cationic ammonium compounds of this invention are represented by the following formula:

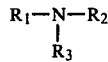

In the formula representing the starting amines, $R_1$, $R_2$, and $R_3$ are hydrogen radicals or alkyl, aryl, alkaryl, or cycloaliphatic hydrocarbon radicals containing from 1-30 carbon atoms with the proviso that at least one of $R_1$, $R_2$, and $R_3$ is a hydrocarbon radical from the group of cycloaliphatic, alkyl, aryl, and alkaryl hydrocarbon radicals and that if any of the hydrocarbon radicals contain more than 4 carbon atoms, the other two aliphatic hydrocarbon radicals must be chosen from the group consisting of hydrogen, methyl and ethyl hydrocarbon radicals. As an example, these amines may be dimethyl amine, trimethyl amine, diethyl amine, triethyl amine, tripropyl amine, N,N-dimethylbutyl amine, N-methyl, N-ethyl, butyl amine, N,N-dimethylcyclohexylamine, N,N-dimethylcoco amine, aniline, N,N-dimethyl aniline, and the like. The steric hindrance effects exhibited by tributyl amines and higher alkyl tertiary amines can prevent the successful reaction of the perfluoro alcohol/oxirane/epihalohydrin FINAL ADDUCTS described above with the alkylated amines of this invention. However, this steric effect may be minimized or totally eliminated if the alkylated amine used to obtain the desired cationic ammonium compounds of this invention contains at least one methyl or one hydrogen radical substituent. Particular examples of such amines may include any N,N-dimethyl substituted tertiary amines where the third hydrocarbon radical on the nitrogen may contain from 1-30 carbon atoms and which may be alkyl, aryl, alkaryl, or cycloaliphatic and which may be saturated, unsaturated, branched, or cyclic; or most N-methyl substituted secondary amines.

In addition, the cationizing amine may be an aromatic or heterocyclic nitrogen containing compound. The kinds of aromatic and/or heterocyclic amines used in the preparation of quaternary ammonium salts of this invention may include 2-H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4aH-carbazole, carbazole, β-carboline, phenanthridine, acridine, phenanthroline, phenazine, imidazolidine, phenoxazine, cinnoline, pyrrolidine, pyrroline, imidazoline, piperidine, piperazine, indoline, isoindoline, quinuclidine, morpholine, azocine, azepine, 2H-azepine, 1,3,5-triazine, thiazole, pteridine, dihydroquinoline, hexamethylene imine, indazole, and any N-substituted alkyl derivatives thereof whose reaction with the FINAL ADDUCT would provide the nitrogen containing cationic perfluoro compounds of the invention.

Other aromatic nitrogen containing heterocyclics may also be used to obtain the perfluoro aromatic quaternary amine compounds. As an example these heterocyclic amines may consist of any N-alkylated, preferably N-methylated compounds of the secondary heterocyclic amines which appear on the previous list of amine compounds.

The preferred alkylated amines used to obtain the cationic amine compounds of the invention are dimethyl amine, trimethyl amine, aniline, diethyl amine and triethyl amine. The preferred aromatic/heterocyclic amines used to prepare the aromatic/heterocyclic cationic ammonium salts of this invention are morpholine, N-methyl morpholine, pyridine, isoquinoline, and quinoline.

When primary or secondary amines such as aniline, N-methyl aniline, dimethyl amine, diethyl amine, pyrrole, and the like, are used, the product of the reaction is an amine hydrohalide salt which has cationic character by virtue of the protonic nature of such salts. The preferred salts would be the hydrochloride salts. These materials are expected to have varying surface active character depending on the pH of any aqueous phase with which they come into contact, by solution or otherwise. If the pH of such an aqueous media is sufficiently high, the hydrohalide salt will become neutralized and the free amine ADDUCT will then be created. This amine would be represented by the formula:

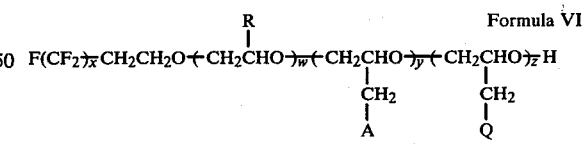

wherein x, w, y, z, R, and A have the same meaning as in Formula II and III above. In Formula VI, Q would be a cationic amine radical derived from any primary or secondary amine previously mentioned above after the originally formed hydrohalide salt has been neutralized with a strong base reagent such as NaOH, KOH and the like. A preferred composition is that obtained when Q represents a cationic secondary nitrogen radical chosen from the group consisting of any heterocyclic nitrogen radical on a secondary amine formed from heterocyclics in the list above, i.e., pyrrole, isoindole, indole, β-carboline, carbazole, and the like.

As an example, if equimolar quantities of aniline and the FINAL ADDUCT were reacted to completion, and the subsequent hydrohalide salt was neutralized, the Formula VI above would be:

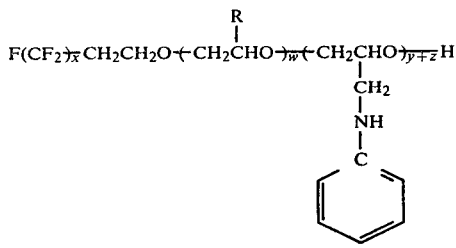

The Catalysts

The catalysts used in the reactions of the perfluoro alcohol previously described, the oxirane and substituted oxirane compounds previously described, and the epihalohydrins described above are chosen from Lewis acid compounds. These catalysts are represented by antimony pentachloride, boron trichloride, boron trifluoride, stannic chloride, ferric and ferrous chloride, and the like. The Lewis acid preferred in both the reaction between the perfluoro alcohol and the oxirane compounds, as well as between the alkoxylate ADDUCT formed by this first reaction and the epihalohydrin is antimony pentachloride. The catalyst is used at a concentration ranging from 0.01% based on the FINAL ADDUCT up to about 1.0% by weight based on the FINAL ADDUCT weight. A preferred range of catalyst is between 0.1% and 0.5% by weight based on the FINAL ADDUCT. A most preferred catalyst concentration, particularly in reference to the use of antimony pentachloride is between 0.2 and 0.4% by weight of the FINAL ADDUCT obtained from this combined reaction.

Reaction Conditions, Synthesis of Perfluoro Alcohol/Oxirane Compounds

The initial alkoxylate ADDUCTS required to manufacture the compounds of this invention are synthesized by reacting the perfluoro alcohol described above with the oxirane and substituted oxirane compounds described above. This first reaction is done under anhydrous conditions and is catalyzed by a Lewis acid catalyst, again described above. After this initial alkoxylate ADDUCT is formed, it is then reacted with an epihalohydrin to obtain the FINAL ADDUCT.

The reaction of the perfluoro alcohol with the oxirane and substituted oxiranes is accomplished by using the following method or variations thereof.

To an autoclave which has previously been charged with the perfluoro alcohol and a Lewis acid catalyst, an amount of an oxirane or substituted oxirane or a mixture thereof is added at such a rate so as to maintain a reaction temperature between 60° and 140° C. The reaction is catalyzed by a Lewis acid, preferably antimony pentachloride, and additional catalyst may be added simultaneously with the addition of the oxirane/substituted oxirane compounds. The oxirane/substituted oxirane compounds may be added in such quantities such that the molar ratio of perfluoro alcohol to oxirane/substituted oxirane compounds is between 1:4 and 1:10, and a most preferred molar ratio is between 1:6 and 1:8. The reaction rate may be controlled by using a combination of temperature and catalyst concentration variations.

Once the oxirane/substituted oxirane compounds are completely charged to the autoclave, the autoclave is maintained at a temperature of at least 80° C. until the reaction is completed. It is preferred that the autoclave be maintained at temperatures of at least 100° C. for a time period of at least 30 minutes following the completed addition of the oxirane/substituted oxirane chosen. The autoclave may be cooled and sample removed for analysis or for further chemical reaction. Additional oxirane/substituted oxirane may be charged to obtain higher molecular ratios of perfluoro alcohol and oxirane/substituted oxirane or to vary the type of oxirane/substituted oxirane substitution in the final product. The reaction may be conveniently monitored by analyzing unreacted oxiranes using Gas Chromatographic techniques. The most preferred ADDUCT is obtained when residual oxirane levels are about 0.2 weight percent or below.

Alternatively, the autoclave may be maintained at reaction temperature while additional catalyst and the epihalohydrin chosen to obtain the FINAL ADDUCT is added to the autoclave contents. The preferred FINAL ADDUCT is again obtained when residual epihalohydrin levels are about 0.2 weight percent or below as is conveniently monitored by using Gas Chromatographic techniques. All of the above reactions are anhydrous in nature and are accomplished in an inert atmosphere such as is obtained by a nitrogen environment.

Reaction Conditions; Synthesis of Perfluoro Alcohol/Oxirane-Substituted Oxirane/Epihalohydrin Adduct Once the initial alkoxylated ADDUCT is formed using reaction conditions described above, or variations thereof, the autoclave may be cooled and the initial alkoxylated ADDUCT removed for further reactions. As above, the initial ADDUCT may be reacted with quantities of epihalohydrin such that the desired molar ratios represented in Formula III above may be obtained. Again, reaction conditions are anhydrous, in an inert environment such as may be obtained with a nitrogen atmopshere, under Lewis acid catalyst conditions previously described, and are best obtained by the addition of the chosen epihalohydrin, such as epichlorohydrin, to an autoclave containing the previously reacted compound derived from the reaction of perfluoro alcohol and the oxirane/substituted oxirane compounds.

The reaction temperatures are preferably maintained below 120° C. and the Lewis acid catalyst is preferably used at a concentration of at least 0.1% based on the weight of the expected final product. The preferred catalyst is, again, antimony pentachloride, although BF3 etherate may also be readily used. The antimony pentachloride gives fewer side reaction products and is most preferred as a catalyst for this reaction.

The addition of epihalohydrin is maintained at a rate to control the reaction temperature below 120° C., preferably within a range between 60° and 100° C. After epihalohydrin addition is completed, the reactants are heated for at least an additional 30 minutes at a temperature of about 100° C. so as to obtain complete reaction. As required, additional catalyst may be added so as to enhance the reaction rate leading to final and complete reaction of all reactants. Additional epihalohydrin may be added so as to increase the mole ratio of the final product obtained through this reaction. When the preferred ADDUCT is obtained, i.e., the ADDUCT represented by Formula III above, the quaternization reaction may be commenced in the same autoclave or may be commenced by cooling the autoclave contents, isolating the contents or a portion thereof, and reacting this product with one of the appropriate quaternizing amine reagents previously described.

Reaction Conditions, The Quaternization or Amine Reaction

The reaction between the perfluoro alcohol/oxirane-substituted oxirane/epihalohydrin ADDUCT and the alkylated amine may be conducted using either one of two methods.

1. Amine Reaction, Method I - To the autoclave containing the perfluoro alcohol/oxirane-substituted oxirane/epihalohydrin ADDUCT is added sufficient alkylated amine or aromatic/heterocyclic amine to react with the halogen functionality of this FINAL ADDUCT. The addition of the alkylated amine is controlled at a rate such that the reaction temperatures do not exceed 125° C. As desired, the amine may be added as a solution in water, methanol, ethanol, or similar low molecular weight alcohols, or mixtures thereof. Alternatively, enough water, methanol, ethanol, and similar low molecular weight alcohols or mixtures thereof may be added to the autoclave so as to dilute the reactants contained therein. The reactants are then heated under pressure to temperatures not exceeding 125° C. until the quaternization or amine reaction is essentially completed. Slight excess of the alkylated amine or aromatic/heterocyclic amine may be added to the autoclave to ensure that complete cationization reaction is achieved. The product may be diluted to desired concentrations with either the addition of water, methanol, ethanol, or other alcoholic diluents, or mixtures thereof.

2. Amine Reaction Method II - After the formation of perfluoro alcohol/oxirane-substituted oxirane/epihalohydrin ADDUCT, the autoclave may be cooled and sufficient FINAL ADDUCT removed to accomplish a cationic amine reaction in a separate reaction vessel. This separate reaction vessel is preferably a closed vessel capable of containing pressurized reactants and equipped with agitation, temperature measuring, and reactant addition capabilities as well as means for heating and cooling. Sufficient FINAL ADDUCT is added to this closed vessel with methanol or methanol/water mixtures so as to obtain a diluted solution containing approximately 50% by weight of the FINAL ADDUCT. The environment within the vessel may be modified so as to be non-reactive, preferably by using a nitrogen exchange for the reactor's environment. Sufficient alkylated amine or aromatic/heterocyclic amine is added to obtain at least 50 mole percent conversion of the halogen functionality of the FINAL ADDUCT to an amine, a hydrohalide salt of the amine or a quaternary salt depending on starting amine and final pH. The vessel may be heated to temperatures not exceeding 125° C. until this partial or complete amination/quaternization is completed. Again, concentrated solutions may be obtained by dissolving the product of these reactions in water, methanol, ethanol, or mixtures thereof. More exotic solvents such as DMSO, DMF and the like may also be used but are generally avoided because of additional costs. The reaction vessel need not be pressurized if the amine used to obtain the cationic amine product of the invention is not particularly volatile. When trimethylamine is used, it is preferred to use a pressurized PARR autoclave. To better describe and exemplify the invention, the following examples are set forth.

EXAMPLES

I. Alkoxylates—the formation of the initial adduct between the perfluoro alcohol and the oxirane/substituted oxirane compounds.

A. Ethylene Oxide (EO)

EXAMPLE 1

To a PARR autoclave is added 485 grams (1 mole) Zonyl BA alcohol and 1 cc of antimony pentachloride. The autoclave was closed and heated to 50° C. 176 grams (approximately 4 moles) of ethylene oxide was slowly added to the autoclave, the addition rate being controlled in such a manner as to maintain the reaction temperature below 100° C. After at least ½ of the EO was added, the addition rate was increased in such a manner as to allow the reaction temperature to slowly rise to 140° C. After the addition of ethylene oxide was completed, the autoclave temperature was maintained at 130°–140° C. for 1 hour. The contents of the autoclave were then cooled and removed from the autoclave. The reaction product is the mixed alkoxylate expected from the addition of 4 moles of ethylene oxide to 1 mole of the zonyl BA perfluoro alcohol.

EXAMPLE 2

485 grams of the Zonyl BA alcohol and 1 cc of antimony pentachloride was added to an autoclave and heated to 50° C. 264 grams (6 moles) of EO was added slowly so as to maintain reaction temperature below 100° C. Reaction temperature may be controlled by the addition rate of EO or by adjusting the rate of cooling of the PARR autoclave using external cooling coils. After about ½ of the ethylene oxide was added, the reaction temperature was allowed to rise to 140° C. After the addition of EO was completed, the reaction vessel temperature was maintained between 130°–140° C. for approximately 1 hour by heating this reaction vessel. The contents were cooled are removed from the autoclave. The reaction product is that expected from the 6 mole addition of EO to the Zonyl BA perfluoro alcohol previously described.

EXAMPLE 3

The conditions of Examples 1 and 2 were repeated except that 8 moles of ethylene oxide were added at such a rate as to control the reaction temperature below 140° C. The product mix obtained was that expected from the 8 mole addition of ethylene oxide to the perfluoro alcohol.

B. Propylene Oxide (PO)

EXAMPLE 4

To an autoclave was added 1200 grams (2.42 moles) of the Zonyl BA perfluoro alcohol. The autoclave was purged with nitrogen and 2 cc of antimony pentachloride was added. The autoclave was closed to the atmosphere and heated to 50° C. while stirring. 4.84 moles (about 281 grams) of PO was slowly added to the reaction vessel at a rate sufficient to maintain the reaction temperature below 100° C. Addition of the propylene oxide required approximately 1 hour. The autoclave contents were then heated for another hour at a temperature of 90° C. The reactor was cooled and approximately 320 grams of this 2 mole adduct of the perfluoro alcohol/propylene oxide alkoxylate was removed for further reaction.

EXAMPLE 5

To the materials remaining in the autoclave from Example 4 was added 227 grams of additional propylene oxide. The initial temperature at the start of the reaction was 52° C. The vessel was depressurized and another 0.5 mls. of antimony pentachloride catalyst was added. Addition of the propylene oxide was reinitiated. The temperature of the reaction vessel was less than 80° C. throughout the addition of propylene oxide. The heat source was turned off and the autoclave allowed to cool overnight. The next day, the contents of the autoclave were determined to be the 4 mole adduct of propylene oxide on the perfluoro alcohol.

EXAMPLE 6

300 grams of the alkoxylate adduct obtained from Example 4 was charged to a PARR autoclave along with ⅝ cc of antimony pentachloride. The reactor was purged with nitrogen and heated to 50° C. Addition of propylene oxide was begun. Sufficient propylene oxide was added to the reactor to obtain a 6 mole propylene oxide adduct onto the perfluoro alcohol. The propylene oxide addition rate was maintained so as to control the reaction temperature below 100° C. during the addition of propylene oxide. The reaction vessel was heated for an additional hour after the addition of propylene oxide was completed at a temperature of 100° C. The reaction vessel was cooled and the 6 mole PO/1 mole perfluoro alcohol adduct was removed from the reactor.

EXAMPLE 7

300 grams of the adduct from Example 4 was charged to a PARR autoclave along with 1 milliliter of antimony pentachloride. The same precautions were taken as in Example 6 to maintain reaction temperatures and to maintain a nitrogen atmosphere. Sufficient propylene oxide was added to obtain an 8 mole adduct of propylene oxide and the Zonyl BA perfluoro alcohol.

C. Mixed Oxide Alkoxylate

EXAMPLE 8

To a PARR autoclave was added 485 grams (1 mole) perfluoro alcohol and 2 milliliters of antimony pentachloride. The reactor was purged with nitrogen and closed to the atmosphere. The reactor contents were heated to 50° C. while they were being stirred. 2 moles of propylene oxide were slowly added to the reactor contents at a rate sufficient to maintain the temperature of the reactor below 100° C. The reactor was heated at a temperature of 100° C. for 1.5 hours after the addition of all of the propylene oxide. After this heating period, 2 moles of ethylene oxide were slowly added so as to maintain the reactor temperature at 100° C. The reactor contents were then agitated for an additional hour and the temperature was allowed to rise slowly to 130° C. The temperature was maintained at 130° C. for an hour after all the ethylene oxide had been added. the autoclave was cooled and approximately 685 grams of the final alkoxylate adduct were recovered, demonstrating essentially 100% recovery.

EXAMPLE 9

To an autoclave was added 476.5 grams of Zonyl BA perfluoro alcohol and 1.5 milliliters (3.5 grams) of antimony pentachloride catalyst. The autoclave was purged with nitrogen and closed to the atmosphere. The autoclave was heated to 60°–70° C. for about 30 minutes. A mixture of 84 grams of ethylene oxide and 110 grams of propylene oxide was slowly added to the stirred contents of the autoclave. The addition rate of this mixed oxide solution was controlled such that the temperature never exceeded 90° C. and, in fact, remained in the 75°–85° C. range. The temperature was maintained for about 90 minutes after the addition of the mixed oxide was complete.

To the contents of the PARR autoclave was then added 119 grams or approximately 1.3 moles of epichlorohydrin. The same reaction conditions and temperature ranges were maintained as above. An additional 60 minutes of reaction time was allowed after the addition of epichlorohydrin was complete so as to complete the reaction between the epichlorohydrin and the mixed alkoxylate obtained in the previous reaction step.

After this epichlorohydrin reaction was completed, a 25% solution of trimethylamine in methanol was added to 658.6 grams of the product obtained above. Reaction again was done in a closed vessel under conditions such that the vessel was heated at 95°–105° C. for 8 hours to give the quaternized product as a solution in methanol.

II. The Reaction Between Alkoxylates and Epihalohydrin

EXAMPLE 10

204 grams of an 8 mole EO adduct of the Zonyl BA perfluoro alcohol and 0.25 milliliters of $BF_3$ etherate were placed in a 500 milliliter flask. The flask was equipped with a condenser, a stirrer, a thermometer, and a pressure equalized dropping funnel. This mixture was heated to 50° C. and a nitrogen purge was initiated. Dropwise addition of epichlorohydrin was started. The reaction temperature was held between 55°–60° C. by regulating the rate of addition of epichlorohydrin. Approximately 34.5 grams of epichlorohydrin was added to the flask contents over a period of 1 hour. The reaction contents were postheated for approximately 1.5 hours, then cooled and removed from the flask. The product was an adduct of the perfluoro alcohol/8 mole EO/1.5 mole epichlorohydrin. Product yield as judged by the weight of recovered material was 98+%. Analysis of the product indicated that less than 0.2 weight percent of either ethylene oxide or epichlorohydrin was present in the product.

EXAMPLE 11

Into 3 separated flasks equipped as in Example 10, products from section I.B., Examples 4, 5, and 6, were independently charged. Sufficient $BF_3$ etherate was added to the contents of each flask and the flasks heated to approximately 50° C. Nitrogen purges were started on each flask. Epichlorohydrin was added to each flask so as to yield a 2 mole epichlorohydrin adduct to the materials obtained from Example 4, and a 1.5 mole epichlorohydrin adduct from both the materials of Examples 5 and 6. The epichlorohydrin was added at a rate which maintained the temperature of each reaction vessel at less than 95° C. Again each reaction vessel was postheated for approximately 1 hour at temperatures not exceeding 95° C. The products obtained in each case were respectively those expected from (1) a 1:2:2 mole adduct of perfluoro alcohol/propylene oxide/epichlorohydrin; (2) a 1:4:1.5 mole adduct of perfluoro alcohol/propylene oxide/epichlorohydrin; and (3) a 1:6:1.5 mole adduct of perfluoro alcohol/propylene oxide/epichlorohydrin adduct.

EXAMPLE 12

One mole of a product obtained from following the first step of Example 9 is added to a 500 ml. flask equipped as above. Sufficient epibromohydrin to obtain a 1 mole adduct is slowly added to this material after it is heated to approximately 50° C. and 1 milliliter of antimony pentoxide is added to the flask. The epibromohydrin addition rate is controlled such that the reaction temperature never exceeds 100° C. The product expected is a 1:2:2:1.0 molar adduct of perfluoro alcohol/ethylene oxide/propylene oxide/ and epibromohydrin.

EXAMPLE 13

5 moles of butylene oxide (361.7 grams) were added to 504.7 grams of the Zonyl BA perfluoro alcohol after the alcohol had been charged to a PARR autoclave and heated to 50° C. 1.8 milliliters of antimony pentachloride catalyst was independently charged to the autoclave prior to the addition of the 5 moles of butylene oxide. The rate of addition of the butylene oxide was controlled so that the temperature of the reactants never exceeded 120° C. Again, an additional 1 hour of heating at temperatures between 100° and 120° C. occurred after the addition by butylene oxide was completed.

To the adduct formed above, 1.5 moles of epichlorohydrin was slowly added such that the reaction temperature was again controlled below 120° C. The addition of epichlorohydrin took approximately 1 hour and an additional hour of heating at 110°-120° C. was provided.

Without opening the autoclave, 0.8 moles of trimethylamine was added to the autoclave contents as a 26% solution in methanol. The addition was completed and the reaction temperature maintained at about 120° C. for approximately 2 hours. The pressure within the autoclave initially increased as the trimethylamine solution was added but then decreased as the quaternization reaction was completed.

The autoclave was cooled and the methanol solution of the product removed. The product was determined to be a 1:5:1.5 molar adduct of the Zonyl BA perfluoro alcohol, butylene oxide, and epichlorohydrin which was partially quaternized with trimethylamine. Approximately 52% of the epichlorohydrin moiety of the FINAL ADDUCT was reacted to form the quaternary salt.

EXAMPLE 14

The same procedures as in Example 13 were followed except that approximately 1.5 moles of trimethylamine was added to the autoclave after the formation of the Zonyl BA perfluoro alcohol/butylene oxide/epichlorohydrin adduct. The trimethylamine was added as a 25% solution in methanol and the reaction mixture heated to approximately 95° C. for 4 hours and then to about 105° C. for an additional 5.5 hours. The product obtained was a completely quaternized product with no detectable unreacted chloro functionality remaining on the quaternary adduct (FINAL ADDUCT). The methanol solution was neutralized with HCl and removed from the reactor.

III. The Quaternization Reaction

EXAMPLE 15

The perfluoro alcohol/EO/epichlorohydrin FINAL ADDUCT synthesized in Example 10 is charged to a PARR autoclave. A calculated 1 mole charge of this material is made. The autoclave contents are heated to approximately 50° C. and the vessel is closed to the atmosphere. Approximately 1.3 moles of N,N-dimethylcocoamine dissolved in methanol (as a 20% solution) is added to the reaction vessel. The vessel is heated to approximately 110° C. and the temperature is maintained at that level for approximately 4 hours. The anticipated product from this reaction would be a quaternized material wherein the tertiary amine radical forming the quaternized bond would be that expected from the N,N-dimethylcocoamine materials.

EXAMPLE 16

A product which is formed using reaction conditions similar to Example 10 but wherein the alkoxylate adduct is a simple 1:1 molar ratio of the perfluoro alcohol and ethylene oxide which is subsequently reacted with 5 moles of epichlorohydrin is charged to the PARR autoclave. The temperatures of the reaction mixture are taken to approximately 100° C. and a 10% excess over the amount of pyridine expected to achieve complete quaternization is added to the PARR vessel. Additional methanol is added so as to yield a 50% solids solution of the final quaternized product. The reaction temperatures are maintained at 110°-120° C. for approximately 6 hours at which time the autoclave contents are cooled and the 50% solution is removed.

EXAMPLE 17

The perfluoro alcohol/propylene oxide/epichlorohydrin adducts obtained in Example 11 are each individually added to a 500 milliliter flask. Each of the 3 flasks are equipped with a stirrer, a condenser, a pressure equalized dropping funnel, and a thermometer. To the first flask which contains the 1:2:2 molar ratio adduct is added 2.2 moles of quinoline. The addition is quickly made and the reaction temperature taken to 120° C. for a period of about 6 hours. Sufficient 75/25 volume percent methanol--water mixture is added so as to obtain a 50% solids solution of the final quaternized product.

To the second flask which contains a 1:4:1.5 molar ratio adduct is added approximately 1.6 moles of pyridine as a 20% solution in methanol. The reaction temperature is taken to approximately 100° C. and maintained at that level for about 15 hours.

The reaction contents are neutralized with HCl and removed from the flask after the addition of sufficient methanol to achieve a 45-50% solids solution of the final quaternized product.

The third flask containing a 1:6:1.5 molar adduct of the Zonyl BA perfluoro alcohol, propylene oxide, and epichlorohydrin is also heated to approximately 50° C. with stirring. N,N-dimethylcyclohexylamine is added to the contents of this flask. 1.5 moles of this tertiary amine is added quickly and the temperature of the flask raised by external heating to approximately 100° C. and maintained at that temperature for about 8 hours. Sufficient methanol is added so as to yield approximately 50% solids solution of the final quaternized product in methanol.

EXAMPLE 18

Approximately 1 mole of a 1:2:2:1 molar adduct of the Zonyl BA perfluoro alcohol, ethylene oxide, propylene oxide, and epibromohydrin obtained from Example 12 is added to a PARR autoclave. The temperature of the vessel is raised to approximately 90° C. and the vessel is purged with nitrogen. A 25% solution of trimethylamine in methanol is added to the vessel until 1.1 moles of trimethylamine are added. The reaction temperature is maintained at approximately 90° C. for a period of about 2 hours. The autoclave pressure increases on addition of the trimethylamine/methanol solution but slowly decreases as the quaternization reaction is completed. At the end of the reaction, the autoclave contents are cooled and sufficient 75/25 volume percent methanol/water solvent mixture is added so as to obtain a 50 weight percent solution of the fully quaternized product.

EXAMPLE 19

A mixture of 50.2 grams (0.07 equivalency) of a Zonyl BA alcohol/8 mole propylene oxide/1.5 epichlorohydrin ADDUCT and 8.3 grams (0.07 moles) of N,N-dimethylaniline was heated in an autoclave for six hours at temperatures between 90°-100° C. After the reaction was complete, the autoclave contents were cooled and an equal weight of methanol (58.5 grams) was added to the reaction mixture to yield a solution of the final quaternary salt product which has the structure:

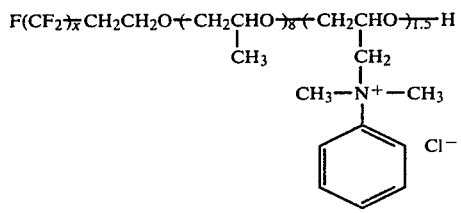

where x has an average value of about 6–8.

EXAMPLE 20

In each of the reactions mentioned above which involve the reaction of epichlorohydrin or other epihalohydrins with the perfluoro alcohol, an analytical method was used to determine residual epihalohydrin in the reaction product. As previously indicated, the lower the value of residual epihalohydrin, the better the cationic perfluoronated surfactant that is obtained. Epichlorohydrin is again used as the epihalohydrin in the following procedures.

The following equipment was used to determine residual epichlorohydrin in reaction products involving the starting materials.

A Gas Chromatograph such as the Hewlett-Packard 5700 equipped with glass-lined injection ports and a flame ionization detector is also equipped with an analytical column which is 10 feet by ⅛ inch stainless steel tubing packed with 10 weight percent Carbowax 20M plus 2 percent KOH on chromosorb W-AW, 80/100 mesh. The chromatograph is also equipped with a one millivolt range recorder and a peak area integrator. Standards are made from reagent grade epichlorohydrin, and reagent grade dichloromethane is used as a solvent. The Gas Chromatograph is operated with the following instrument conditions:

| | |
|---|---|
| 1. Nitrogen carrier gas flow | 30 ml/min |
| 2. Injection port temperature | 100° C. |
| 3. Detector temperature | 150° C. |
| 4. Column temperature | 80° C. isothermal |
| 5. Range | 100 |
| 6. Attenuation | 1 |
| 7. Chart speed | 1 cm/min |
| 8. Stop time | 10 min. |

The instrument is calibrated by weighing from 0.01 grams to 0.1 milligram of epichlorohydrin into a 10 milliliter stoppered graduated cylinder which contains several milliliters of reagent grade dichloromethane. This solution is then diluted to 10 milliliters with additional reagent grade dichloromethane. A factor for external standard calibration may be calculated by dividing the concentration of the standard solution by the instrument response. When comparing standard values with sample values, care must be taken to insure that the calibration standard volume injected onto the chromatograph column is exactly the same as the volume of the sample solution injected onto this column.

The analysis for residual ethylene oxide or propylene oxide in the reaction products of this invention is done in a similar fashion to that mentioned above. Again, a Gas Chromatograph such as the Hewlett-Packard 5700 equipped with glass-lined injection ports and a flame ionization detector as well as an analytical column, which in this case is 6 feet by ⅛ inch stainless steel tubing packed with chromosorb 101, 80/100 mesh, is used with the following instrument conditions:

| | |
|---|---|
| 1. Nitrogen carrier gas flow | 30 ml/min |
| 2. Injection port temperature | 150° C. |
| 3. Detector temperature | 150° C. |
| 4. Column temperature | 120° C. isothermal |
| 5. Range | 100 |
| 6. Attenuation | 1 |
| 7. Chart speed | 1 cm/min |
| 8. Stop time | 12 min. |

The standard solutions are made again from reagent grade ethylene oxide, propylene oxide, or butylene oxide according to which of the oxiranes or substituted oxiranes are being determined. In this case reagent grade tetrahydrofuran is used as the solvent. Calibration is accomplished as before wherein a prescribed amount of the oxirane material is accurately weighed into a 10 milliliter graduated cylinder containing a small quantity of THF solvent and subsequently diluted to exactly a 10 milliliter volume. A sample of this standard solution is injected onto the chromatograph column for external standard calibration. Again, care must be exercised to insure that the volume of calibration solution injected onto the column is exactly the same as the volume of sample solution injected onto the chromatograph column for analysis.

Determination of residual oxirane or substituted oxiranes is necessary to determine the efficiency of reaction for the synthesis of the initial ADDUCT in this invention. It is preferred that less than 0.2 weight percent residual oxirane or substituted oxirane materials exist in the reactant solutions before additional epihalohydrin is added to form the FINAL ADDUCT. Likewise, it is preferred that less than 0.2 weight percent residual epichlorohydrin exist in the FINAL ADDUCT solutions prior to reaction with any of the cationizing amines used in this invention.

The following Table I summarizes the possible reactants and the anticipated FINAL ADDUCT and anticipated products which would be obtained under the general conditions previously outlined. Reaction temperatures and reaction times can be raised or lowered to obtain the anticipated reaction product.

TABLE I

| REACTANTS AND MOLES USED | | | | | FINAL ADDUCT | ANTICIPATED PRODUCT |
|---|---|---|---|---|---|---|
| FA | EO | PO | EPI | AMINE | | |
| 1.0 | 4.0 | — | 2.0 | TMA, 2.2 | $F(CF_2)_{\overline{x}}CH_2CH_2O(CH_2CH_2O)_{\overline{4}}$ $(CH_2CHO)_{\overline{2}}H$ $\quad\quad\quad\mid$ $\quad\quad\quad CH_2$ $\quad\quad\quad\mid$ $\quad\quad\quad Cl$ | $F(CF_2)_{\overline{x}}CH_2CH_2O(CH_2CH_2O)_{\overline{4}}(CH_2CHO)_{\overline{2}}H$ $\quad\quad\quad\quad\quad\quad\quad\quad\quad\quad\quad\quad\mid$ $\quad\quad\quad\quad\quad\quad\quad\quad\quad\quad\quad CH_2$ $\quad\quad\quad\quad\quad\quad\quad\quad\quad\quad\quad\mid\quad\quad\quad CH_3$ $\quad\quad\quad\quad\quad\quad\quad\quad\quad H_3C-N^+-CH_3\ Cl^-$ $\quad\quad\quad\quad\quad\quad\quad\quad\quad\quad\quad\mid$ $\quad\quad\quad\quad\quad\quad\quad\quad\quad\quad\quad CH_3$ |
| 1.0 | 3.0 3.0 sequential | | 1.0 | DMA, 1.1 | $F(CF_2)_{\overline{x}}CH_2CH_2O(CH_2CH_2O)_{\overline{3}}$ $(CH_2CHO)_{\overline{3}}(CH_2CHO)H$ $\quad\mid\quad\quad\quad\quad\quad\mid$ $\quad CH_3\quad\quad\quad\quad CH_2$ $\quad\quad\quad\quad\quad\quad\quad\quad\mid$ $\quad\quad\quad\quad\quad\quad\quad\quad Cl$ | $F(CF_2)_{\overline{x}}CH_2CH_2O(CH_2CH_2O)_{\overline{3}}(CH_2CHO)_{\overline{3}}(CH_2CHO)H$ $\quad\quad\quad\quad\quad\quad\quad\quad\quad\quad\quad\quad\mid\quad\quad\quad\quad\quad\quad\mid$ $\quad\quad\quad\quad\quad\quad\quad\quad\quad\quad\quad CH_3\quad\quad\quad\quad\quad CH_2$ $\quad\quad\quad\quad\quad\quad\quad\quad\quad\quad\quad\quad\quad\quad\quad\quad\mid\quad\quad CH_3$ $\quad\quad\quad\quad\quad\quad\quad\quad\quad\quad\quad\quad\quad\quad\quad CH_3-N^+-H\ Cl^-$ $\quad\quad\quad\quad\quad\quad\quad\quad\quad\quad\quad\quad\quad\quad\quad\quad\mid$ $\quad\quad\quad\quad\quad\quad\quad\quad\quad\quad\quad\quad\quad\quad\quad\quad CH_3$ |
| 1.0 | 4.0 4.0 mixed | | 1.5 | TMA, 1.7 | $F(CF_2)_{\overline{x}}CH_2CH_2O(CH_2CHO)_{\overline{8}}$ $(CH_2CHO)H$ $\quad\mid$ $\quad CH_2$ Where R = H, CH$_3$ $\quad\mid$ $\quad Cl$ | $F(CF_2)_{\overline{x}}CH_2CH_2O(CH_2CHO)_{\overline{8}}(CH_2CHO)H$ $\quad\quad\quad\quad\quad\quad\quad\quad\quad\quad R\quad\quad\quad\mid$ $\quad\quad\quad\quad\quad\quad\quad\quad\quad\quad\quad\quad\quad CH_2$ $\quad\quad\quad\quad\quad\quad\quad\quad\quad\quad\quad\quad\quad\mid\quad CH_3$ $\quad\quad\quad\quad\quad\quad\quad\quad\quad\quad\quad\quad CH_3-N^+-CH_3\ Cl^-$ $\quad\quad\quad\quad\quad\quad\quad\quad\quad\quad\quad\quad\quad\quad\mid$ $\quad\quad\quad\quad\quad\quad\quad\quad\quad\quad\quad\quad\quad\quad CH_3$ |
| 1.0 | 8.0 | — | 4.0 | M, 2.0 | $F(CF_2)_{\overline{x}}CH_2CH_2O(CH_2CH_2O)_{\overline{8}}$ $(CH_2CHO)H$ $\quad\mid$ $\quad CH_2$ $\quad\mid$ $\quad Cl$ | $F(CF_2)_{\overline{x}}CH_2CH_2O(CH_2CH_2O)_{\overline{8}}(CH_2CHO)_{\overline{2}}H$ $\quad\quad\quad\quad\quad\quad\quad\quad\quad\quad\quad\quad\quad\quad\mid$ $\quad\quad\quad\quad\quad\quad\quad\quad\quad\quad\quad\quad\quad CH_2$ $\quad\quad\quad\quad\quad\quad\quad\quad\quad\quad\quad\quad\quad\mid$ $\quad\quad\quad\quad\quad\quad\quad\quad\quad\quad\quad\quad\quad Cl$ |
| 1.0 | — | 8.0 | 2.0 | Aniline, 2.1 | $F(CF_2)_xCH_2CH_2O(CH_2CHO)_8(CH_2CH_2O)_2H$ $\quad\quad\quad\quad\quad\quad\quad\quad\mid$ $\quad\quad\quad\quad\quad\quad\quad CH_3\quad\quad CH_2$ $\quad\quad\quad\quad\quad\quad\quad\quad\quad\quad\quad\quad\mid$ $\quad\quad\quad\quad\quad\quad\quad\quad\quad\quad\quad\quad Cl$ | $F(CF_2)_xCH_2CH_2O(CH_2CHO)_8(CH_2CH_2O)_2H$ $\quad\quad\quad\quad\quad\quad\quad\quad\quad\mid$ $\quad\quad\quad\quad\quad\quad\quad\quad CH_3\quad\quad\quad CH_2$ $\quad\quad\quad\quad\quad\quad\quad\quad\quad\quad\quad\quad\quad\mid$ $\quad\quad\quad\quad\quad\quad\quad\quad\quad HN^+H\quad Cl^-$ $\quad\quad\quad\quad\quad\quad\quad\quad\quad\quad\mid$ $\quad\quad\quad\quad\quad\quad\quad\quad\quad\quad\bigcirc$ (phenyl) |

TABLE I-continued

| REACTANTS AND MOLES USED | | | | | FINAL ADDUCT | ANTICIPATED PRODUCT |
|---|---|---|---|---|---|---|
| FA | EO | PO | EPI | AMINE | | |
| 1.0 | 10 mixed | 10 | 5 | NNDMA, 3.0 | $F(CF_2)_xCH_2CH_2O(CH_2CHO)_{20}(CH_2CHO)_3H$ with branch $CH_2-Cl$, R = H, $CH_3$ equally | $F(CF_2)_xCH_2CH_2O(CH_2CHO)_{20}(CH_2CHO)_3H$ with branch $CH_2-N^+(CH_3)(C_6H_5)CH_3\ Cl^-$, R = H, $CH_3$ equally |
| 1.0 | — | 4.0 | 2.0 | NMM, 2.1 | $F(CF_2)_xCH_2CH_2O(CH_2CHO)_4(CH_2CHO)_2H$ with $CH_3$ branch and $CH_2-Cl$ branch | $F(CF_2)_xCH_2CH_2O(CH_2CHO)_4(CH_2CHO)_2H$ with quaternary morpholinium $CH_2-N^+(CH_3)$(morpholine) $Cl^-$ |
| 1.0 | 7 | — | 1.5 | Acridine, 1.6 | $F(CF_2)_{\overline{x}}CH_2CH_2O(CH_2CH_2O)_{\overline{H}}(CH_2CHO)_{\overline{1.5}}H$ with $CH_2-Cl$ branch | $F(CF_2)_{\overline{x}}CH_2CH_2O(CH_2CH_2O)_{\overline{H}}(CH_2CHO)_{\overline{1.5}}H$ with $CH_2$-N-acridinium $Cl^-$ |
| 1.0 | 6 mixed | 3 | 1.0 | DMIPA; 1.1 | $F(CF_2)_{\overline{x}}CH_2CH_2O(CH_2CH_2O)_{\overline{H}}(CH_2CHO)H$ with R branch, R = H, $CH_3$; where H = 2($CH_3$), $\overline{x}$ = 6-8 (ave.) | $F(CF_2)_{\overline{x}}CH_2CH_2O(CH_2CH_2O)_{\overline{H}}(CH_2CHO)CH_2CHOH$ with $CH_2-N^+(CH_3)_2CH(CH_3)_2\ Cl^-$, R = H, $CH_3$; where H = 2($CH_3$) |
| 1.0 | 2 | — | 2 | carbazole, 2.1 | $F(CF_2)_{\overline{x}}CH_2CH_2O(CH_2CH_2O)_{\overline{2}}(CH_2CHO)_{\overline{2}}H$ with $CH_2-Cl$ branch, x = 6-8 (ave.) | $F(CF_2)_{\overline{x}}CH_2CH_2O(CH_2CH_2O)_{\overline{2}}(CH_2CHO)_{\overline{2}}H$ with $CH_2-N^+H$(carbazole) $Cl^-$ |

TABLE I

| REACTANTS AND MOLES USED | | | | | FINAL ADDUCT | ANTICIPATED PRODUCT |
|---|---|---|---|---|---|---|
| FA | EO | PO | EPI | AMINE | | |
| 1.0 | 4.0 | — | 2.0 | TMA, 2.2 | F(CF$_2$)$_{\overline{x}}$CH$_2$CH$_2$O(CH$_2$CH$_2$O)$_{\overline{x}}$<br>(CH$_2$CHO)$_{\overline{z}}$H<br>    |<br>   CH$_2$<br>    |<br>   Cl | F(CF$_2$)$_{\overline{x}}$CH$_2$CH$_2$O(CH$_2$CH$_2$O)$_{\overline{x}}$(CH$_2$CHO)$_{\overline{z}}$H<br>                                        |<br>                                       CH$_2$<br>                                       |<br>                H$_3$C—N$^+$—CH$_3$ Cl$^-$<br>                            |<br>                           CH$_3$ |
| 1.0 | 3.0 sequential | 3.0 | 1.0 | DMA, 1.1 | F(CF$_2$)$_{\overline{x}}$CH$_2$CH$_2$O(CH$_2$CH$_2$O)$_{\overline{x}}$<br>(CH$_2$CHO)$_{\overline{y}}$(CH$_2$CHO)H<br>    |           |<br>   CH$_3$     CH$_2$<br>               |<br>              Cl | F(CF$_2$)$_{\overline{x}}$CH$_2$CH$_2$O(CH$_2$CH$_2$O)$_{\overline{x}}$(CH$_2$CHO)$_{\overline{y}}$(CH$_2$CHO)H<br>                                  |            |<br>                                 CH$_3$  CH$_2$<br>                                          |<br>                 CH$_3$—N$^+$—H Cl$^-$<br>                           |<br>                         CH$_3$ |
| 1.0 | 4.0 mixed | 4.0 | 1.5 | TMA, 1.7 | F(CF$_2$)$_{\overline{x}}$CH$_2$CH$_2$O(CH$_2$CHO)$_{\overline{n}}$<br>                                    |<br>                                  R<br>(CH$_2$CHO)$_{1.5}$H<br>|<br>CH$_2$ Where R = H, CH$_3$<br>|<br>Cl | F(CF$_2$)$_{\overline{x}}$CH$_2$CH$_2$O(CH$_2$CHO)$_{\overline{n}}$(CH$_2$CHO)$_{1.5}$H<br>                                       |<br>                                       CH$_2$<br>                                     |<br>         CH$_3$—N$^+$—CH$_3$ Cl$^-$<br>                 |<br>              CH$_3$ |
| 1.0 | 8.0 | — | 4.0 | M, 2.0 | F(CF$_2$)$_{\overline{x}}$CH$_2$CH$_2$O(CH$_2$CH$_2$O)$_{\overline{x}}$<br>(CH$_2$CHO)$_{\overline{x}}$H<br>|<br>CH$_2$<br>|<br>Cl | F(CF$_2$)$_{\overline{x}}$CH$_2$CH$_2$O(CH$_2$CH$_2$O)$_{\overline{x}}$(CH$_2$CHO)$_{\overline{x}}$H<br>                                       |<br>                                     CH$_2$<br>                                    |<br>                               N—H<br>                              //+<br>                             O |
| 1.0 | — | 8.0 | 2.0 | Aniline, 2.1 | F(CF$_2$)$_{\overline{x}}$CH$_2$CH$_2$O(CH$_2$CHO)$_{\overline{x}}$(CH$_2$CHO)$_2$H<br>                                  |<br>                               CH$_3$<br>                               |<br>                               CH$_2$<br>                               |<br>                       HN$^+$H Cl$^-$—C$_6$H$_5$ | F(CF$_2$)$_x$CH$_2$CH$_2$O(CH$_2$CHO)$_8$(CH$_2$CHO)$_2$H<br>                                      |<br>                                     CH$_2$<br>                                     |<br>                             HN$^+$H Cl$^-$—Ph |

TABLE I-continued

| REACTANTS AND MOLES USED | | | | | FINAL ADDUCT | ANTICIPATED PRODUCT |
|---|---|---|---|---|---|---|
| FA | EO | PO | EPI | AMINE | | |
| 1.0 | 10 mixed | 10 | 5 | NNDMA, 3.0 | $F(CF_2)_xCH_2CH_2O(CH_2CHO)_{20}(CH_2CHO)_3H$<br>$\quad\quad\quad\quad\quad\quad\quad\quad\quad\quad\quad\quad\quad R\quad\quad\quad CH_2$<br>$\quad\quad\quad\quad\quad\quad\quad\quad\quad\quad\quad\quad\quad\quad\quad\quad\quad Cl$<br>R = H, CH$_3$ equally | $F(CF_2)_xCH_2CH_2O(CH_2CHO)_{20}(CH_2CHO)_3H$<br>$\quad\quad\quad\quad\quad\quad\quad\quad\quad\quad\quad\quad\quad R\quad\quad\quad CH_2$<br>$\quad\quad\quad\quad\quad\quad\quad\quad\quad\quad\quad\quad\quad\quad\quad\quad CH_3-N^+-CH_3\quad Cl^-$<br>$\quad\quad\quad\quad\quad\quad\quad\quad\quad\quad\quad\quad\quad\quad\quad\quad\quad\quad\quad Ph$<br>R = H, CH$_3$ equally |
| 1.0 | — | 4.0 | 2.0 | NMM, 2.1 | $F(CF_2)_xCH_2CH_2O(CH_2CHO)_4(CH_2CHO)_2H$<br>$\quad\quad\quad\quad\quad\quad\quad\quad\quad\quad\quad\quad CH_3\quad\quad CH_2$<br>$\quad\quad\quad\quad\quad\quad\quad\quad\quad\quad\quad\quad\quad\quad\quad\quad Cl$ | $F(CF_2)_xCH_2CH_2O(CH_2CHO)_4(CH_2CHO)_2H$<br>$\quad\quad\quad\quad\quad\quad\quad\quad\quad\quad\quad\quad CH_3\quad\quad CH_2$<br>$\quad\quad\quad\quad\quad\quad\quad\quad\quad\quad\quad\quad\quad\quad\quad N^+-CH_3\quad Cl^-$<br>(morpholinium ring) |
| 1.0 | 7 | — | 1.5 | Acridine, 1.6 | $F(CF_2)_xCH_2CH_2O(CH_2CH_2O)_7(CH_2CHO)_{1.5}H$<br>$\quad\quad\quad\quad\quad\quad\quad\quad\quad\quad\quad\quad\quad\quad\quad\quad CH_2$<br>$\quad\quad\quad\quad\quad\quad\quad\quad\quad\quad\quad\quad\quad\quad\quad\quad\quad Cl$ | $F(CF_2)_xCH_2CH_2O(CH_2CH_2O)_7(CH_2CHO)_{1.5}H$<br>$\quad\quad\quad\quad\quad\quad\quad\quad\quad\quad\quad\quad\quad\quad\quad\quad CH_2$<br>$\quad\quad\quad\quad\quad\quad\quad\quad\quad\quad\quad\quad\quad\quad\quad\quad N^+$ (acridinium) Cl$^-$ |
| 1.0 | 6 mixed | 3 | 1.0 | DMIPA; 1.1 | $F(CF_2)_xCH_2CH_2O(CH_2CHO)_H(CH_2CHO)H$<br>$\quad\quad\quad\quad\quad\quad\quad\quad\quad\quad\quad\quad R$<br>R = H, CH$_3$<br>where H = 2(CH$_3$)<br>x = 6-8 (ave.) | $F(CF_2)_xCH_2CH_2O(CH_2CHO)_H CH_2CHOH$<br>$\quad\quad\quad\quad\quad\quad\quad\quad\quad\quad\quad\quad R\quad\quad CH_2$<br>$\quad\quad\quad\quad\quad\quad\quad\quad\quad\quad\quad\quad\quad CH_3-N^+-CH_3\quad Cl^-$<br>$\quad\quad\quad\quad\quad\quad\quad\quad\quad\quad\quad\quad\quad\quad\quad CH(CH_3)_2$<br>R = H, CH$_3$<br>where H = 2(CH$_3$) |
| 1.0 | 2 | — | 2 | carbazole, 2.1 | $F(CF_2)_xCH_2CH_2O(CH_2CH_2O)_2(CH_2CHO)_2H$<br>$\quad\quad\quad\quad\quad\quad\quad\quad\quad\quad\quad\quad\quad\quad\quad\quad CH_2$<br>$\quad\quad\quad\quad\quad\quad\quad\quad\quad\quad\quad\quad\quad\quad\quad\quad\quad Cl$<br>x = 6-8 (ave.) | $F(CF_2)_xCH_2CH_2O(CH_2CH_2O)_2(CH_2CHO)_2H$<br>$\quad\quad\quad\quad\quad\quad\quad\quad\quad\quad\quad\quad\quad\quad\quad\quad CH_2$<br>$\quad\quad\quad\quad\quad\quad\quad\quad\quad\quad\quad\quad\quad\quad\quad N^+-H\quad Cl^-$ (carbazolium) |

TABLE 1-continued

| REACTANTS AND MOLES USED | | | | FINAL ADDUCT | ANTICIPATED PRODUCT |
|---|---|---|---|---|---|
| FA | EO | PO | EPI | AMINE | | |
| 1.0 | | 8 | 1.0 | NPA, 1.1 | $F(CF_2)_{\overline{x}}CH_2CH_2O(CH_2CH-O)_{\overline{8}}CH_2CHOH$<br>      $\quad\quad\quad\quad\quad\quad\quad\quad\quad\quad|\quad\quad\quad\quad\quad\quad\quad\quad\quad\quad\quad\quad\quad\quad|$<br>      $\quad\quad\quad\quad\quad\quad\quad\quad\quad\quad CH_3\quad\quad\quad\quad\quad\quad\quad\quad\quad CH_2$<br>      $\quad\quad\quad\quad\quad\quad\quad\quad\quad\quad\quad\quad\quad\quad\quad\quad\quad\quad\quad\quad\quad\quad\quad\quad\quad Cl$<br><br>$x = 6\text{–}8 \text{ (ave.)}$ | $F(CF_2)_{\overline{x}}CH_2CH_2O(CH_2CHO)_{\overline{8}}CH_2CHOH$<br>      $\quad\quad\quad\quad\quad\quad\quad\quad\quad\quad|\quad\quad\quad\quad\quad\quad\quad\quad\quad\quad\quad\quad\quad\quad|$<br>      $\quad\quad\quad\quad\quad\quad\quad\quad\quad\quad CH_3\quad\quad\quad\quad\quad\quad\quad\quad\quad CH_2$<br>      $\quad\quad\quad\quad\quad\quad\quad\quad\quad\quad\quad\quad\quad\quad\quad\quad\quad\quad\quad\quad\quad\quad N^+\text{—}CH_3\quad Cl^-$ |

Having thus described our invention, we claim:

1. A chemical composition represented by the formula:

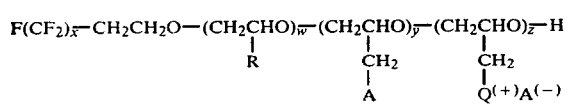

wherein:
(a) x is from 2–12;
(b) w is from 1–20;
(c) y is from 0–20, and z is from 0–20, provided that the sum, y+z is from 1–20;
(d) R is from the group of hydrogen, methyl, ethyl, propyl radicals and mixtures thereof;
(e) A is a halogen chosen from chlorine, bromine, or iodine; and
(f) Q is a cationic nitrogen radical from the group consisting of:
  (1) an aromatic amino radical,
  (2) an heterocyclic amino radical, and
  (3) an amine radical represented by the formula:

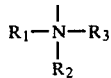

wherein $R_1$, $R_2$ and $R_3$ are from the group consisting of hydrocarbon radicals containing from 1–30 carbon atoms and hydrogen radicals, provided that at least one of $R_1$, $R_2$ and $R_3$ is from the group consisting of alkyl, aryl, alkaryl and cyclo-aliphatic hydrocarbon radicals containing from 1–30 carbon atoms and that when any one of $R_1$, $R_2$ and $R_3$ radicals contains more than 4 carbon atoms, the other two radicals are each chosen from the group consisting of hydrogen, methyl, and ethyl radicals.

2. The composition of claim 1 wherein:
(a) x is from 4–10;
(b) w is from 4–10;
(c) y and z are each from 0–8, provided that the sum, y+z, is from 1–8;
(d) R is from the group of hydrogen and methyl radicals, and mixtures thereof;
(e) A is chlorine; and
(f) Q is from the group of dimethylamino, trimethylamino, pyridino, quinolino, isoquinolino, N,N dimethyl anilino, N-methyl morpholino, and morpholino radicals.

3. The composition of claim 1 wherein:
(a) x is from 6–8;
(b) w is from 6–8;
(c) y and z are each from 0–4, provided that the sum, y+z, is from 1–4;
(d) R is from the group of hydrogen and methyl radicals and mixtures thereof;
(e) A is chlorine; and
(f) Q is from the group of trimethyl amino, pyridino, quinolino, morpholino, and isoquinolino radicals.

4. The composition of claim 3 wherein the value of the ratio y/z is between 0 and 1.0.

5. A chemical composition represented by the formula:

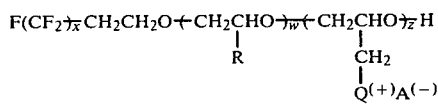

wherein:
(a) x is from 2–12;
(b) w is from 1–20;
(c) z is from 1–20;
(d) R is from the group of hydrogen, methyl, ethyl, propyl radicals, and mixtures thereof;
(e) A is a halogen from the group, chlorine, bromine, and iodine; and
(f) Q is a cationic nitrogen radical from the group consisting of:
  (1) an aromatic amino radical;
  (2) an heterocyclic amino radical; and
  (3) an amine radical represented by the formula:

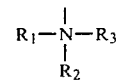

wherein $R_1$, $R_2$, and $R_3$ are from the group consisting of hydrocarbon radicals containing from 1–30 carbon atoms and hydrogen radicals provided that at least one of $R_1$, $R_2$, and $R_3$ is from the group consisting of alkyl, aryl, alkaryl and cycloaliphatic hydrocarbon radicals containing from 1–30 carbon atoms and that when any one of $R_1$, $R_2$, and $R_3$ radicals contains more than 4 carbon atoms, the other two radicals are each chosen from the group consisting of hydrogen, methyl, and ethyl radicals.

6. The chemical composition of claim 5 wherein:
(a) x is from 4–10;
(b) w is from 4–10;
(c) Z is from 1–4;
(d) R is chosen from the group of hydrogen and methyl radicals, and mixtures thereof;
(e) A is chloride; and
(f) Q is a cationic nitrogen radical from the group consisting of:
  (1) trimethyl amino, dimethyl amino, pyridino, diethyl amino, triethyl amino, quinolino, anilino, N-methyl anilino, isoquinolino, N,N,dimethyl anilino, morpholineo, N-methyl pyrrolo, acridino, and N-methyl morpholino radicals.

7. The composition of claim 6 wherein:
(a) x is from 6–8;
(b) w is from 6–8;
(c) z is from 1.5–2.5; and
(d) Q is a cationic nitrogen radical from the group consisting of trimethylamino, pyridino, quinolino, isoquinolino, and morpholino radicals.

8. The composition of claim 6 wherein:
(a) x is from 6–8;
(b) w is from 6–8;
(c) z is from 1.5–2.5; and
(d) Q is a cationic secondary nitrogen radical chosen from the group consisting of:
  (1) a secondary heterocyclic nitrogen radical, and
  (2) a secondary aliphatic nitrogen radical having the formula:

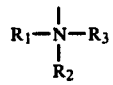

wherein R₃ is always H; R₁ and R₂ are hydrocarbon radicals containing from 1–30 carbon atoms provided that when any of R₁, R₂ contains more than 4 carbon atoms, the remaining radical is chosen from the group consisting of methyl and ethyl radicals; such the Q represents an amine hydrochloride salt.

9. The composition of claim 8 wherein the amine hydrochloride salt has been neutralized with a strong base chosen from the group, NaOH and KOH.

10. The composition of claim 7 wherein Q represents the trimethyl amine nitrogen radical.

* * * * *